(12) United States Patent
Schuh (10) Patent No.: US 10,482,543 B2
(45) Date of Patent: Nov. 19, 2019

(54) APPARATUS AND METHOD FOR VALIDATING TRANSACTIONAL DATA

(71) Applicant: Kurt B. Schuh, Clermont, FL (US)

(72) Inventor: Kurt B. Schuh, Clermont, FL (US)

(73) Assignee: Kurt B. Schuh, Clermont, FL (US)

( * ) Notice: Subject to any disclaimer, the term of this patent is extended or adjusted under 35 U.S.C. 154(b) by 473 days.

(21) Appl. No.: 14/999,497

(22) Filed: May 12, 2016

(65) Prior Publication Data

US 2017/0330290 A1    Nov. 16, 2017

(51) Int. Cl.
*G06Q 40/00*        (2012.01)
(52) U.S. Cl.
CPC .................. *G06Q 40/123* (2013.12)
(58) Field of Classification Search
None
See application file for complete search history.

(56) References Cited

U.S. PATENT DOCUMENTS

| | | | | |
|---|---|---|---|---|
| 7,221,763 B2* | 5/2007 | Verbauwhede | ....... | H04L 9/0631 380/277 |
| 7,801,301 B2* | 9/2010 | Macchetti | ............. | H04L 9/0631 380/239 |
| 8,363,834 B1* | 1/2013 | Singhal | ..................... | G06F 7/58 380/270 |
| 2008/0025504 A1* | 1/2008 | Rapp | ..................... | H04L 9/0844 380/46 |
| 2008/0147554 A1* | 6/2008 | Stevens | ............... | G06F 21/6254 705/51 |
| 2011/0302640 A1* | 12/2011 | Liu | ................... | H04L 29/12207 726/6 |
| 2013/0322618 A1* | 12/2013 | Coleridge | ........... | G06F 21/6227 380/44 |
| 2015/0161413 A1* | 6/2015 | Calem | ................ | G06F 21/6245 705/51 |
| 2015/0170144 A1* | 6/2015 | Palma Lizana | ....... | H04L 9/0861 705/44 |
| 2016/0127134 A1* | 5/2016 | Goldstone | ............... | G06F 21/36 726/7 |
| 2017/0011404 A1* | 1/2017 | Clower | ............. | G06Q 20/4016 |
| 2017/0134156 A1* | 5/2017 | Laine | ...................... | G06F 7/483 |
| 2017/0187748 A1* | 6/2017 | Durand | ................... | H04L 63/04 |

* cited by examiner

*Primary Examiner* — Kaveh Abrishamkar (57) ABSTRACT

The invention creates a single use authentication code from (1) predefined unencrypted data from at least one tax form, (2) primary keys, and (3) a secondary key generated from metadata correlated to the input of the unencrypted data, the above elements being used by a data encryption circuit having a polynomial integer encryption (PIE) engine, to generate the authentication code. The authentication code is translated into at least one symbol, using, for example, barcode technology, and applied to a tax document or form or otherwise encoded into electronic documents.

10 Claims, 13 Drawing Sheets

1. SSN, (SuperKey) INTEGRATION OF SSN METADATA (RED), ACROSS THE SENTENAL/PRIME AND PIE INTEGRATOR

- SENTENAL METADATA/PIE INTEGRATED RESPECTIVE, SuperKey (SSN), INTEGRATED KEY (IRS SENTENAL), SECONDARY KEY (EHR/PIE), AND W2 AND W3 DATA LAYERS, WITH THE METADATA CREATED WHEN THE W2 AND W3 DATA FIELDS ARE POPULATED

- METADATA; RECORDS THE (WHEN), SPECIFIC DAYTIME GROUP (DTG), AND THE WHO (PERSON) ENTERS THE DATA FIELDS, AND INTEGRATES A PLETHORA OF ADDITIONAL ENCRYPTION POLYNOMIAL ENCRYPTION ALGORITHM(S), BASED UPON THE METADATA

FIG. 3

1. IRS SENTENAL, INTEGRATED KEY, INTEGRATES CyberSecurity TOOLS, FRAUD DETECTION, AND COMPLIANCE TOOL SET
2. PROVIDES HQ IRS, AND IRS REGIONAL OFFICES, CyberSecurity TOOLS; IMPROVED FRAUD DETECTION, AND IDENTIFY IRS CODE COMPLIANCE ISSUES

- SENTENAL METADATA/PIE INTEGRATED RESPECTIVE, SuperKey (SSN), INTEGRATED KEY (IRS SENTENAL), SECONDARY KEY (EHR/PIE), AND W2 AND W3 DATA LAYERS, WITH THE METADATA CREATED WHEN THE W2 AND W3 DATA FIELDS ARE POPULATED
- METADATA; RECORDS THE (WHEN), SPECIFIC DAYTIME GROUP (DTG), AND THE WHO (PERSON) ENTERS THE DATA FIELDS, AND INTEGRATES A PLETHORA OF ADDITIONAL ENCRYPTION POLYNOMIAL ENCRYPTION ALGORITHM(S), BASED UPON THE METADATA

| 1 | 7 | 5 | 9 | Z | A | 7 | 1 | 4 | 9 |
|---|---|---|---|---|---|---|---|---|---|
| NAND | XOR | AND | XNOR | NOT | AND | XOR | NAND | NEG-AND | XNOR |

1. HER/PIE, (SECONDARY KEY), INTEGRATES COMPONENTS OF IRS W2 AND W3; INCREASE CyberSecurity PROTECTION THROUGH METADATA ENCRYPTION ALGORITHM

| SENTENAL/ PRIME Layer: HER/PIE | SSN SuperKey | IRS SENTENAL INTEGRATED KEY | EHR/PIE SECONDARY KEY | SENTENAL METADATA/PIE INTEGRATOR |

- SENTENAL METADATA/PIE INTEGRATED RESPECTIVE, SuperKey (SSN), INTEGRATED KEY (IRS SENTENAL), SECONDARY KEY (EHR/PIE), AND W2 AND W3 DATA LAYERS, WITH THE METADATA CREATED WHEN THE W2 AND W3 DATA FIELDS ARE POPULATED

- METADATA; RECORDS THE (WHEN), SPECIFIC DAYTIME GROUP (DTG), AND THE WHO (PERSON) ENTERS THE DATA FIELDS, AND INTEGRATES A PLETHORA OF ADDITIONAL ENCRYPTION POLYNOMIAL ENCRYPTION ALGORITHM(S), BASED UPON THE METADATA

FIG. 7

SENTENAL/ PRIME LAYER: DATA INTEGRATOR

SSN SuperKey

IRS SENTENAL INTEGRATED KEY

EHR/PIE SECONDARY KEY

SENTENAL METADATA/PIE INTEGRATOR

DATA LAYERS

FIG. 8

1. METADATA INTEGRATION (PIE) STACK INTERFACES (ORANGE)
2. SSN, (SuperKey) INTEGRATION OF SSN METADATA (RED)
3. IRS SENTENAL, INTEGRATED KEY, INTEGRATES FRAUD DETECTION, AND COMPLIANCE TOOL SET, METADATA
4. HER/PIE, (SECONDARY KEY), INTEGRATES COMPONENTS OF IRS W2 AND W3; INCREASE METADATA ENCRYPTION ALGORITHM

| SENTENAL/ PRIME Layer: METADATA | SSN SuperKey | IRS SENTENAL INTEGRATED KEY | EHR/PIE SECONDARY KEY | SENTENAL METADATA/PIE INTEGRATOR |

- SENTENAL METADATA/PIE INTEGRATED RESPECTIVE, SuperKey (SSN), INTEGRATED KEY (IRS SENTENAL), SECONDARY KEY (EHR/PIE), AND W2 AND W3 DATA LAYERS, WITH THE METADATA CREATED WHEN THE W2 AND W3 DATA FIELDS ARE POPULATED
- METADATA; RECORDS THE (WHEN), SPECIFIC DAYTIME GROUP (DTG), AND THE WHO (PERSON) ENTERS THE DATA FIELDS, AND INTEGRATES A PLETHORA OF ADDITIONAL ENCRYPTION POLYNOMIAL ENCRYPTION ALGORITHM(S), BASED UPON THE METADATA CAPTURED

| 22222 | Void ☐ | a Employee's social security number | For Official Use Only ►<br>OMB No. 1545-0006 | | |
|---|---|---|---|---|---|
| b Employer identification number (EIN) | | | | 1 Wages, tips, other compensation | 2 Federal income tax withheld |
| c Employer's name, address, and ZIP code | | | | 3 Social Security wages | 4 Social security tax withheld |
| | | | | 5 Medicare Wages and tips | 6 Medicare tax withheld |
| | | | | 7 Social security tips | 8 Allocated tips |
| d Control number | | | | 9 | 10 Dependent care benefits |
| e Employee's first name and initial | Last name | | Suff. | 11 Nonqualified Plans | 12a See instructions for box 12 |
| | | | | 13 Statutory  Retirement  Third-party<br>    employee   Plan        sick pay<br>        ☐         ☐           ☐ | 12b |
| | | | | | 12c |
| | | | | 14 Other | 12d |
| f Employee's address and ZIP code | | | | | |
| 15 State  Employer's state ID number | 16 State wages, tips, etc. | 17 State income tax | 18 Local wages, tips, etc. | 19 Local income tax | 20 Locality name |

Form W-2 Wage and Tax Statement  2015  Department of the Treasury - Internal Revenue Service Copy A for Social Security Administration - Send this entire page with Form W-3 to
the Social Security Administration; photocopies are not acceptable.

For Privacy Act and Paperwork Reduction
Act Notice, see the separate instructions.

Cat. No. 10134D

Do Not Cut, Fold, or Staple Forms on This Page

| 33333 | a Control number | For Official Use Only ▶ OMB No. 1545-0006 | | |
|---|---|---|---|---|
| b Kind of Payer (Check one) | 941 ☐  Military ☐  943 ☐  944 ☐  CT-1 ☐  Hshld. emp. ☐  Medicare govt. emp. ☐ | Kind of Employer (Check one) | None apply ☐  501c non-govt. ☐  State/local non-501c ☐  State/local 501c ☐  Federal govt. ☐ | Third-party sick pay (Check if applicable) ☐ |
| c Total number of Forms W-2 | d Establishment number | 1 Wages, tips, other compensation | | 2 Federal income tax withheld |
| e Employer identification number (EIN) | | 3 Social security wages | | 4 Social security tax withheld |
| f Employer's name | | 5 Medicare wages and tips | | 6 Medicare tax withheld |
| | | 7 Social security tips | | 8 Allocated tips |
| | | 9 | | 10 Dependent care benefits |
| g Employer's address and ZIP code | | 11 Nonqualified plans | | 12a Deferred compensation |
| h Other EIN used this year | | 13 For third-party sick pay use only | | 12b |
| | | 14 Income tax withheld by payer of third-party sick pay | | |
| 15 State  Employer's state ID number | | 18 Local wages, tips, etc. | | 19 Local income tax |
| 16 State wages, tips, etc. | 17 State income tax | | | |
| Employer's contact person | | Employer's telephone number | | For Official Use Only |
| Employer's fax number | | Employer's email address | | |

Under penalties of perjury, I declare that I have examined this return and accompanying documents and, to the best of my knowledge and belief, they are true, correct, and complete.

Signature ▶                     Title ▶                     Date ▶

Form W-3  Transmittal of Wage and Tax Statements   2015   Department of the Treasury Internal Revenue Service

FIG. 14
(PRIOR ART)

| ☐ VOID ☐ CORRECTED | | | |
|---|---|---|---|
| FILER'S name, street address, city or town, state or province, country, ZIP or foreign postal code, and telephone no. | FILER'S federal identification no. | OMB No. 1545-2205 2014 Form 1099-K | Payment Card and Third Party Network Transactions |
| | PAYEE'S taxpayer identification no. | | |
| | 1a Gross amount of payment card/third party network transactions $ | 2 Merchant category code | Copy A For Internal Revenue Service Center |
| Check to indicate if FILER is a (an): Payment settlement entity (PSE) ☐ Electronic Payment Facilitator (EPF)/Other third party ☐ | Check to indicate transactions reported are: Payment card ☐ Third party network ☐ | 1b Card Not Present transactions (optional) $ | |
| | | 3 Number of payment transactions | |
| PAYEE'S name | | 4 Federal income tax withheld $ | File with Form 1096 |
| | | 5a January $ | 5b February $ | For Privacy Act and Paperwork Reduction Act Notice, see the 2014 General Instructions for Certain Information Returns. |
| Street address (including apt. no.) | | 5c March $ | 5d April $ | |
| | | 5e May $ | 5f June $ | |
| City or town, state or province, country, and ZIP or foreign postal code | | 5g July $ | 5h August $ | |
| | | 5i September $ | 5j October $ | |
| PSE'S name and telephone number | | 5k November $ | 5l December $ | |
| Account number (see instructions) | 2nd TIN not. ☐ | 6 State | 7 State identification no. | 8 State income tax withheld $ $ |

Form 1099-K    Cat. No. 54118B    www.irs.gov/form1099k    Department of the Treasury - Internal Revenue Service
Do Not Cut or Separate Forms on This Page — Do Not Cut or Separate Forms on this page

APPARATUS AND METHOD FOR VALIDATING TRANSACTIONAL DATA

FIELD

Embodiments of the invention relate to the validation of transactional data, and more particularly, to the receipt of input data, the encryption thereof using a plurality of keys in a predefined sequence using a multi-dimensional array data structure, generating an authentication code based thereon, the authentication code used, inter alia, in the transmission and validation of highly sensitive transactional data, such as taxpayer data.

BACKGROUND

Tax fraud is a significant problem. Identity theft is a primary means by which tax fraud is perpetrated. Since the early 1990s, the United States federal government has lost tens of billions of dollars due to tax fraud. The United States Government Accountability Office has estimated that the Internal Revenue Service (IRS) prevented $24.2 billion in fraudulent refunds in 2013, but paid $5.8 billion later determined to be fraud. Because of the difficulties in ascertaining the amount of undetected fraud, the actual amounts could differ from these GAO estimates. Tax refund fraud often occurs when identity thieves use a legitimate taxpayer's identifying information to file a fraudulent tax return and claim a refund. The IRS identified 642,000 incidents of identity theft in 2012 alone. The foregoing does not include incidents related to "Operation Mass Mail" schemes in which identity thieves use stolen identities of Puerto Rican citizens. As of September 2012, the IRS reported approximately 436,000 incidents related to that scheme. The GAO has recommended that the IRS improve its cost estimate, provide improved metrics, and enhance their authentication processes between the IRS, government officials, return preparers, and financial institutions.

Additionally, the IRS has a complex process to attempt to collect billions of dollars in unpaid tax debts. Tax debts from FY2007 onward is approaching $300 billion, as the IRS had shelved or delayed collection of billions of dollars of tax debt. Improvements in the current three phase tax collection processes are needed to identify, track, and collect tax debt. Although the total extent of refund fraud is still unknown, most efforts are still focused on the detection of fraudulent returns based on identity theft. Whether a fraudulent return is an individual attempt or part of a broader scheme, IRS officials do not systematically track characteristics of known identity theft returns. Such characteristics include the type of return preparation (e.g., paid preparer or software), whether the return is filed electronically or on paper, or how the individual claimed a refund (e.g., check, direct deposit, or debit card).

The problem of fraudulent refunds based on identity theft was first identified by the GAO in 1994. Between 1992 and 1993, about 25,633 fraudulent returns were filed which claimed approximately $53 million in refunds. The IRS reports preventing the payment of about $29 million of those refunds. In the past twenty years, the problem has grown with technological advances. Fraudulent refunds based on identity theft currently have had several significant impacts as the IRS struggles to effectively transform processes and practices. The current losses are more than the lost revenue (tens of billions of dollars). What is desired is an invention which can prevent fraudulent refunds based on, inter alia, identity theft. Such an invention would minimize the impact of lost efficiencies in the areas of debt collection, and lower labor costs associated with identifying fraudulent returns, reduce lost revenue and reverse the loss of confidence from the U.S. Congress and taxpayers.

SUMMARY

Embodiments of the invention relate to the validation of transactional data, and more particularly, to the receipt of input data, the encryption thereof using a plurality of keys in a predefined sequence using a multi-dimensional array data structure, generating an authentication code based thereon, the authentication code used, inter alia, in the transmission and validation of highly sensitive transactional data, such as taxpayer data.

The apparatus of the invention comprises a plurality of electronic components, including a data ingress circuit, a data encryption circuit, a data egress circuit and a non-transitory memory. The data encryption circuit receives input data from the data ingress circuit, operates on such data by applying primary and secondary keys thereto in a predefined sequence using a multi-dimensional array data structure, causes the storage of the keys, predefined sequences and encrypted data in a memory or database and provides an authentication code to the data egress circuit. Each such data ingress, data encryption and data egress circuit includes a specialized processing engine which comprises electronic circuitry embedded on, e.g., a processor chip, configured using computer readable instructions. Each specialized processing engine is further coupled to on chip memories or buffers for storage of data and instructions.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention is best understood by referring to the following description and accompanying drawings that are used to illustrate embodiments of the invention. In the drawings.

DESCRIPTION OF EMBODIMENTS

Embodiments of the invention relate to the validation of transactional data, and more particularly, to the receipt of input data, the encryption thereof using a plurality of primary and secondary keys in a predefined sequence using a multi-dimensional array data structure, generating an authentication code based thereon, the authentication code used, inter alia, in the transmission and validation of highly sensitive transaction data, such as taxpayer data. The authentication code is embodied in alphanumeric characters and/or symbols, such as barcodes or QR codes, and applied to paper forms or embedded in electronic documents. The tax authority retains, in a secure, resilient database, the authentication code as well as the data, keys and sequences used to generate the authentication code. The authentication code as applied to paper forms or embedded in electronic documents is thus operable to be compared by a tax authority to the authentication code stored in its database so as to validate the transactional data contained in the completed paper form or electronic document.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions and/or provide support for multiple application services.

Figure 10:
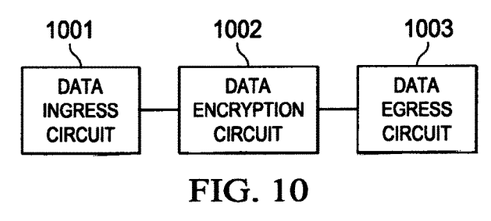
FIG. 10 illustrates a block diagram of the invention.
Figure 11:
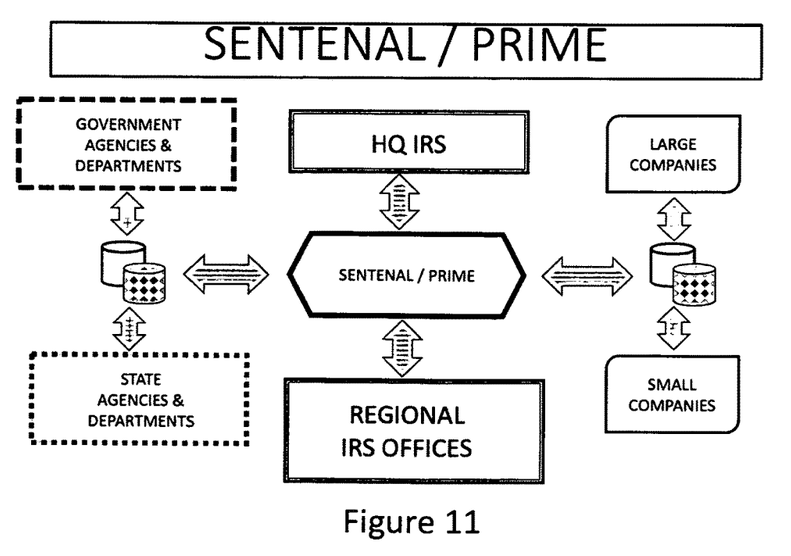
FIG. 11 illustrates the tax reporting and tax authority entities that interact with the invention.

With the foregoing in mind, the invention as seen in FIG. 10 comprises an apparatus having at least the following electronic circuits: (1) a data ingress circuit 1001 for receiving unencrypted data, comprising a plurality of alphanumeric characters or ciphers, from a plurality of sources, the plurality of sources including, but not limited to, remote or local databases belonging to tax authorities and/or tax reporting entities, such as employers, the data ingress circuit further receiving primary and secondary keys and having data and control busses and input/output (I/O) sub-circuits;

(2) a data encryption circuit 1002 coupled to the data ingress circuit, the data encryption circuit operable to index the unencrypted data from the data ingress circuit into a multi-dimensioned array data structure and operate thereon using the primary and secondary keys in a complex Polynomial Integer Encryption (PIE) sequence so as to integrate the plurality of alphanumeric characters or ciphers, the data encryption circuit further having data and control busses and I/O sub-circuits, (3) a data egress circuit 1003 operable to directly or indirectly output an authentication code embodied in alphanumeric characters and/or at least one encoded symbol, the authentication code to be applied to a paper document or embedded in an electronic document, the data egress circuit further having data and control busses and I/O sub-circuits, and optionally, (4) a database for storing, by the tax authority, at least the authentication code.

Figure 9:
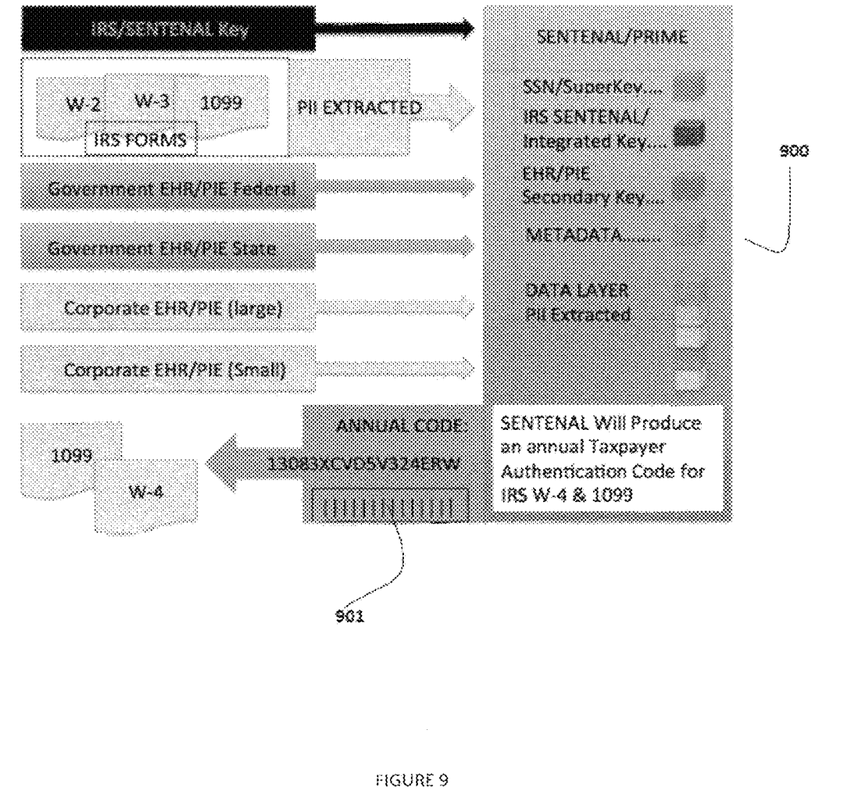
FIG. 9 illustrates SENTENAL/PRIME Functional Overview, including data inputs and authentication code output.

The participants involved in the method of the invention are shown in FIG. 9. The authentication code 901 is generated by the invention pursuant to data provided or caused to be provided by the participants 900.

The data ingress circuit 1001 is operable to receive at an input sub-circuit, and forward to the data encryption circuit 1002 via the output sub-circuit, unencrypted data, including, but not limited to Personal Identifiable Information (PII) that has been binary encoded, such as Social Security Numbers (SSN) or Employer Identification Numbers (EIN). PII can further comprise an individual/employee's name, address, place of employment, address of employment, wage data, and/or income tax, social security taxes, Medicare taxes, unemployment tax withheld, reporting information under the Affordable Care Act, and quarterly reporting for self-employed individuals. Further unencrypted data which can be forwarded to the data encryption circuit 1002 includes a selected Government Fiscal Earning (FE) number as of a certain Fiscal Year and/or a block to include the secure single year selected secure IRS number within the respective IRS form. All such unencrypted data is inputted locally or remotely into the data ingress circuit 1001 by, e.g., a tax authority and/or tax reporting entity. The data ingress circuit is similarly operable to receive primary and secondary keys.

The data encryption circuit 1002 is operable to integrate the plurality of alphanumeric characters or ciphers, apply a sequence of operations via encryption pathways using a plurality of keys in a predetermined sequence using a multidimensional array data structure so as to encrypt the plurality of alphanumeric characters or ciphers and generate an authentication code 901 and output the authentication code 901 through the data encryption circuit output sub-circuit to the data egress circuit input sub-circuit. More specifically, the data encryption circuit 1002 integrates metadata and tags using polynomial integer encryption (PIE) sequences/multidimensional algorithm equations as more fully described herein.

The data egress circuit 1003 formats and then outputs via the data egress output sub-circuit, an authentication code 901 represented by alphanumeric characters and/or symbol such as a barcode or QR code for application to a paper document or for embedding in an electronic document. The data egress circuit 1003 optionally further securely transmits, using e.g., Secure Sockets Layer (SSL) or TLS, the authentication code 901 to a data processing and storage system of the tax authority.

When the paper or electronic document having the applied authentication code 901 in the form of an alphanumeric characters and/or at least one encoded symbol such as a barcode or QR code is completed then transmitted by the tax reporting entity to the tax authority, the tax authority is compare the authentication code 901 contained thereon with the authentication code 901 stored in their database. If the authentication code 901 on the paper or electronic document matches that in the tax authority database, the filing can be considered legitimate. In an embodiment, a tax reporting entity, such as an employer, having a threshold number of employees or greater, such as 50 employees, will be required to use pseudo-random number generator technology in connection with the encrypted transmission of files over the Internet to IRS processing facilities.

Figure 1:
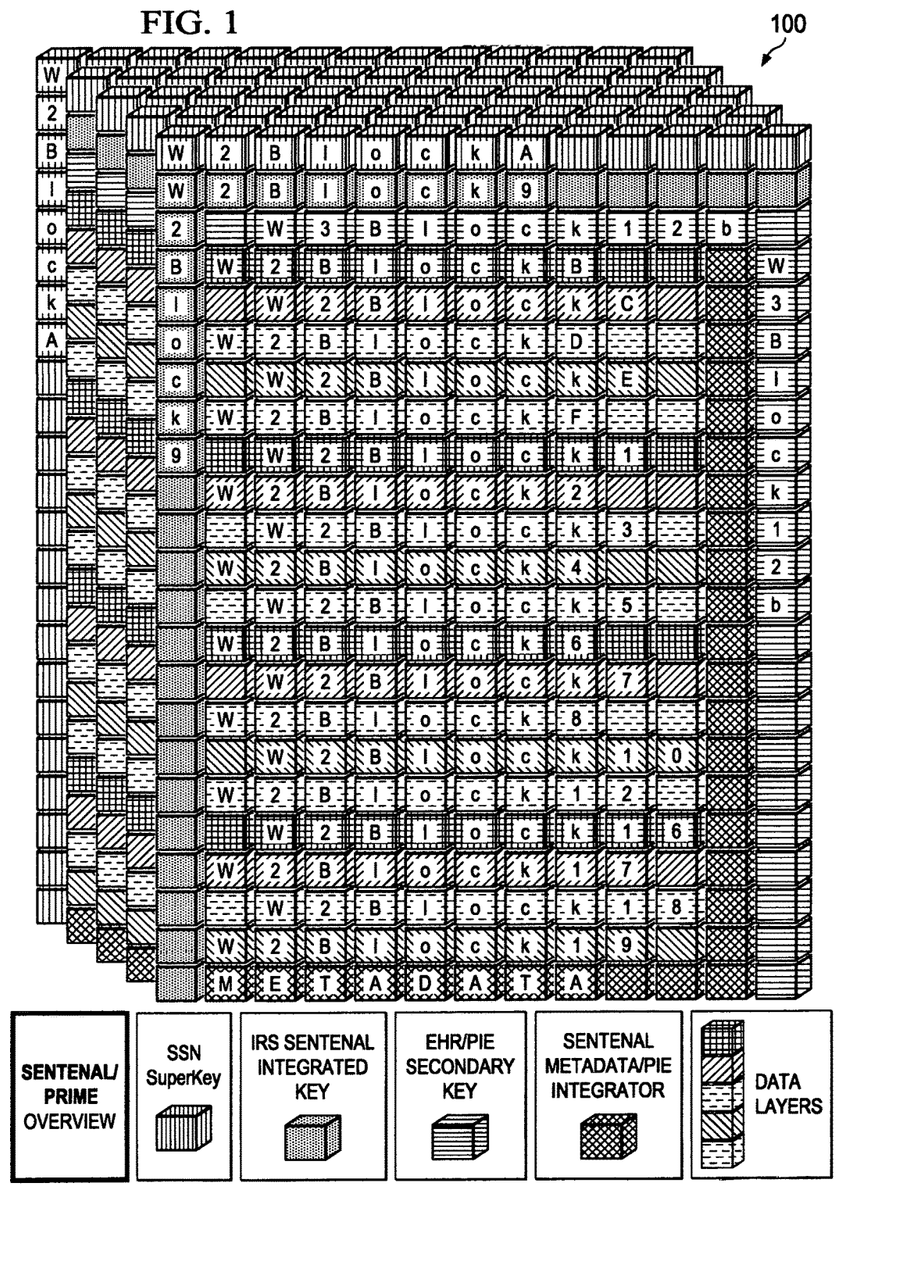
FIG. 1 illustrates the multi-dimensional SENTENAL/PRIME Data Cube as embedded in the data encryption circuit of the invention.
Figure 2:
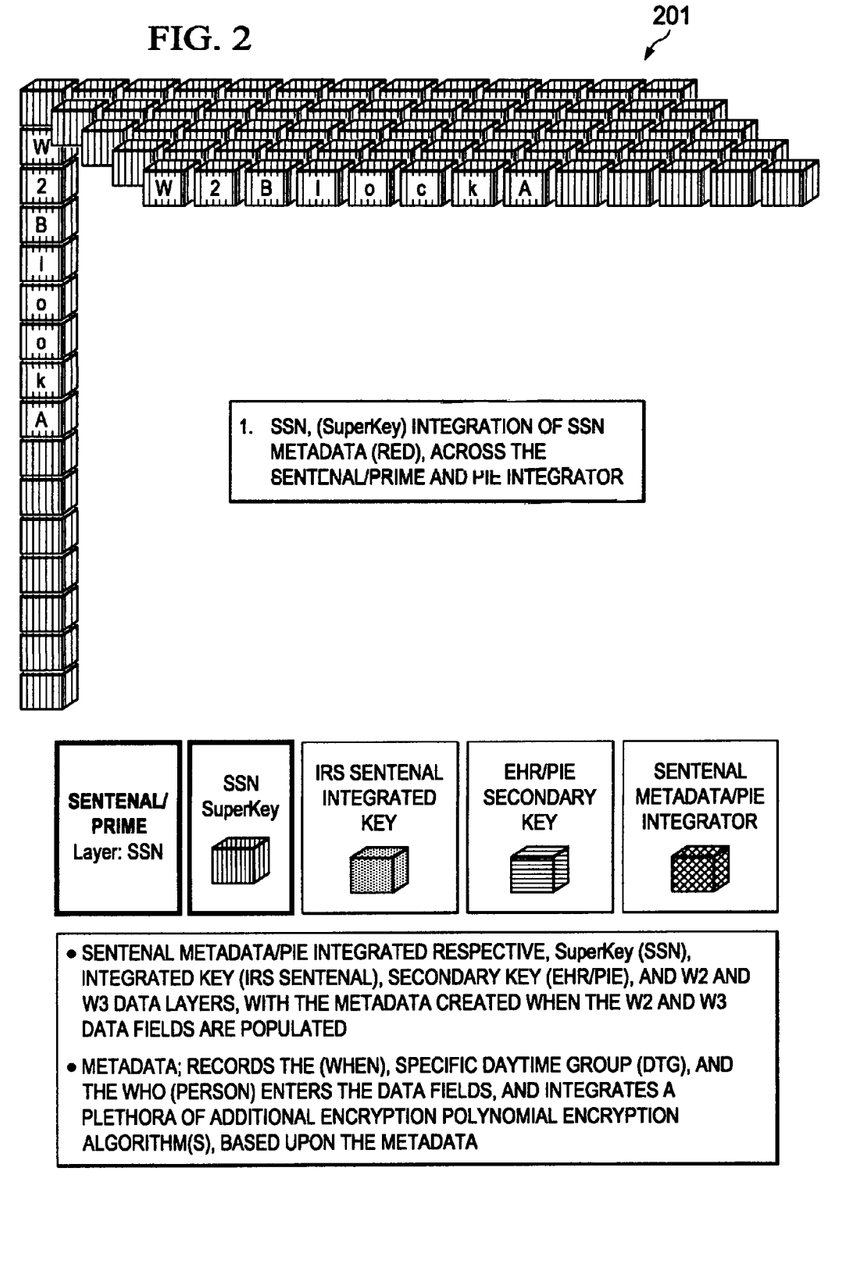
FIG. 2 illustrates the SSN Layer of the SENTENAL/PRIME Data Cube as embedded in the data encryption circuit of the invention.
Figure 3:
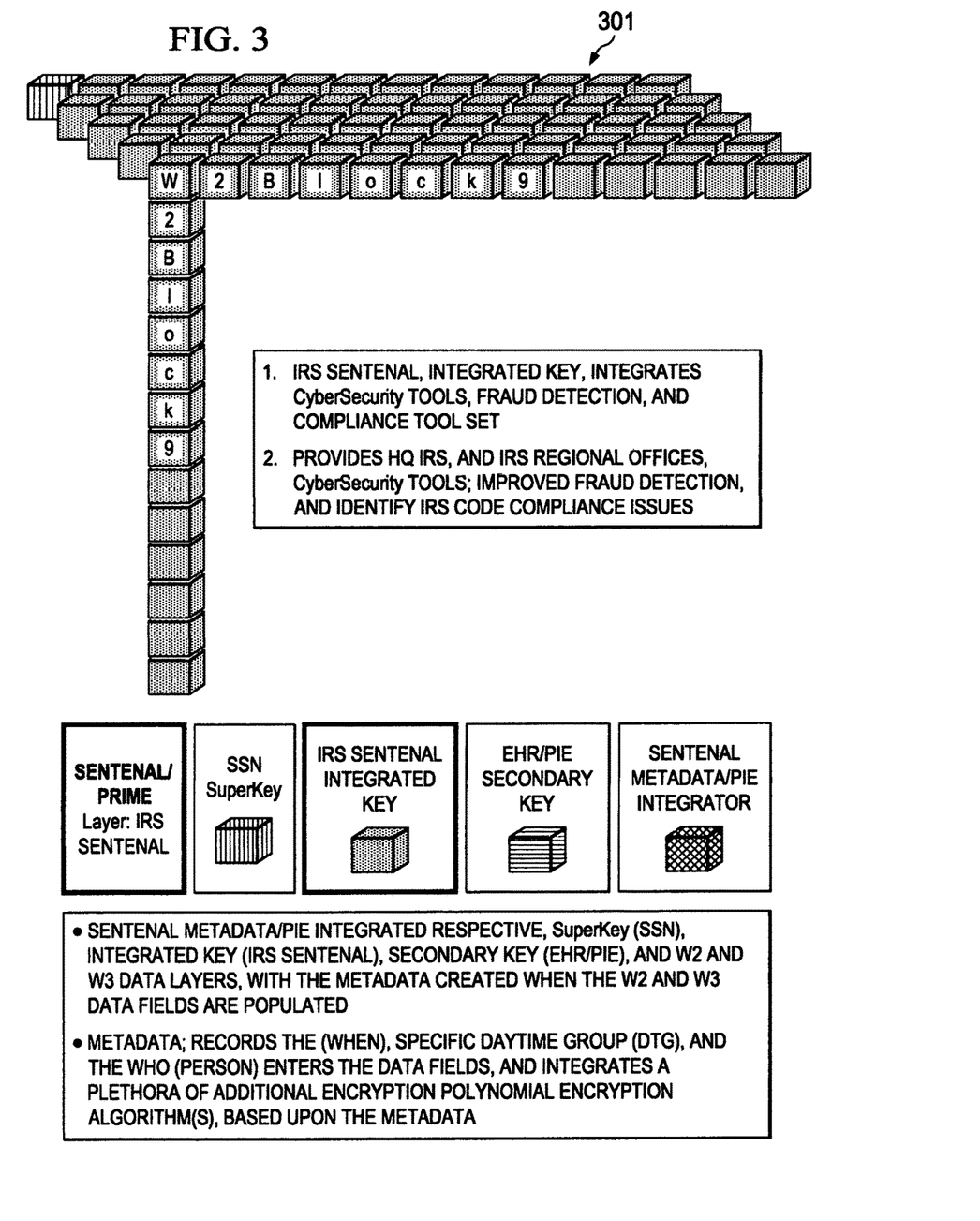
FIG. 3 illustrates the IRS SENTENAL Layer of the SENTENAL/PRIME Data Cube as embedded in the data encryption circuit of the invention.
Figure 4:
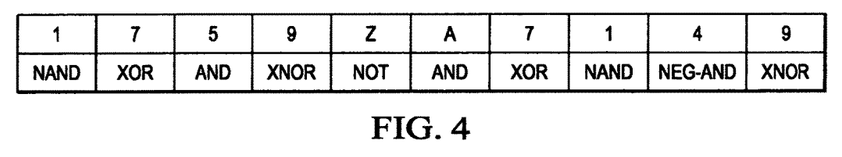
FIG. 4 illustrates an exemplary IRS SENTENAL Key generated using Boolean logic gates.
Figure 5:
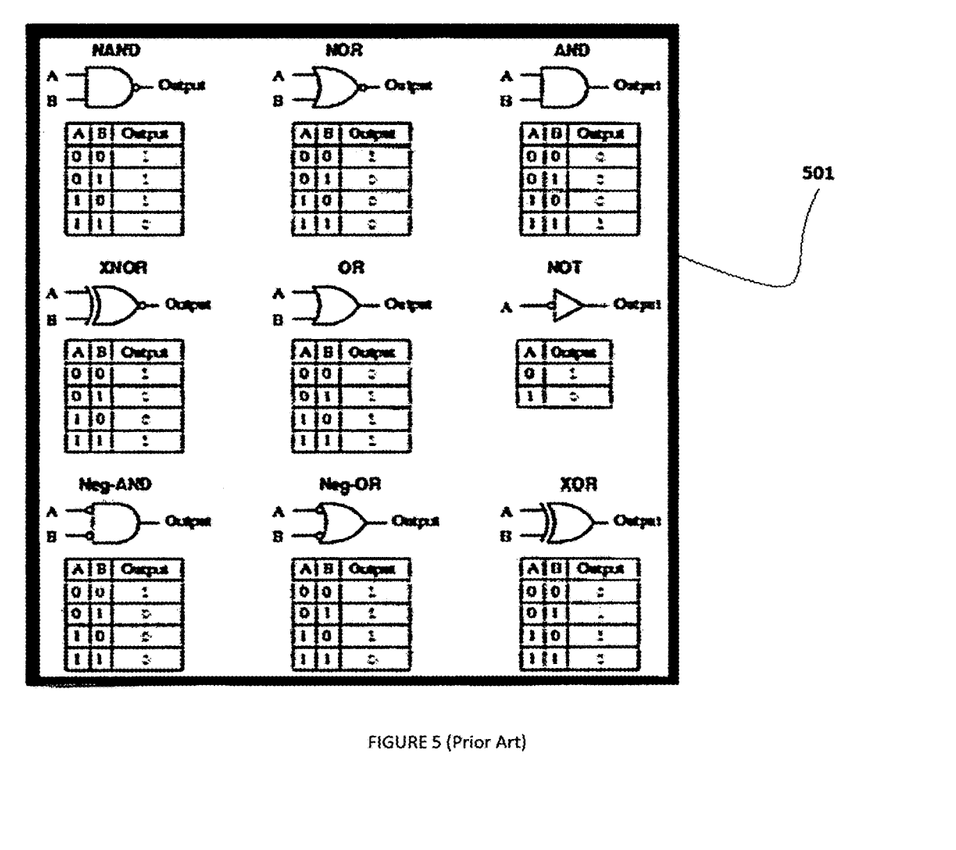
FIG. 5 is a Boolean logic gate chart.
Figure 6:
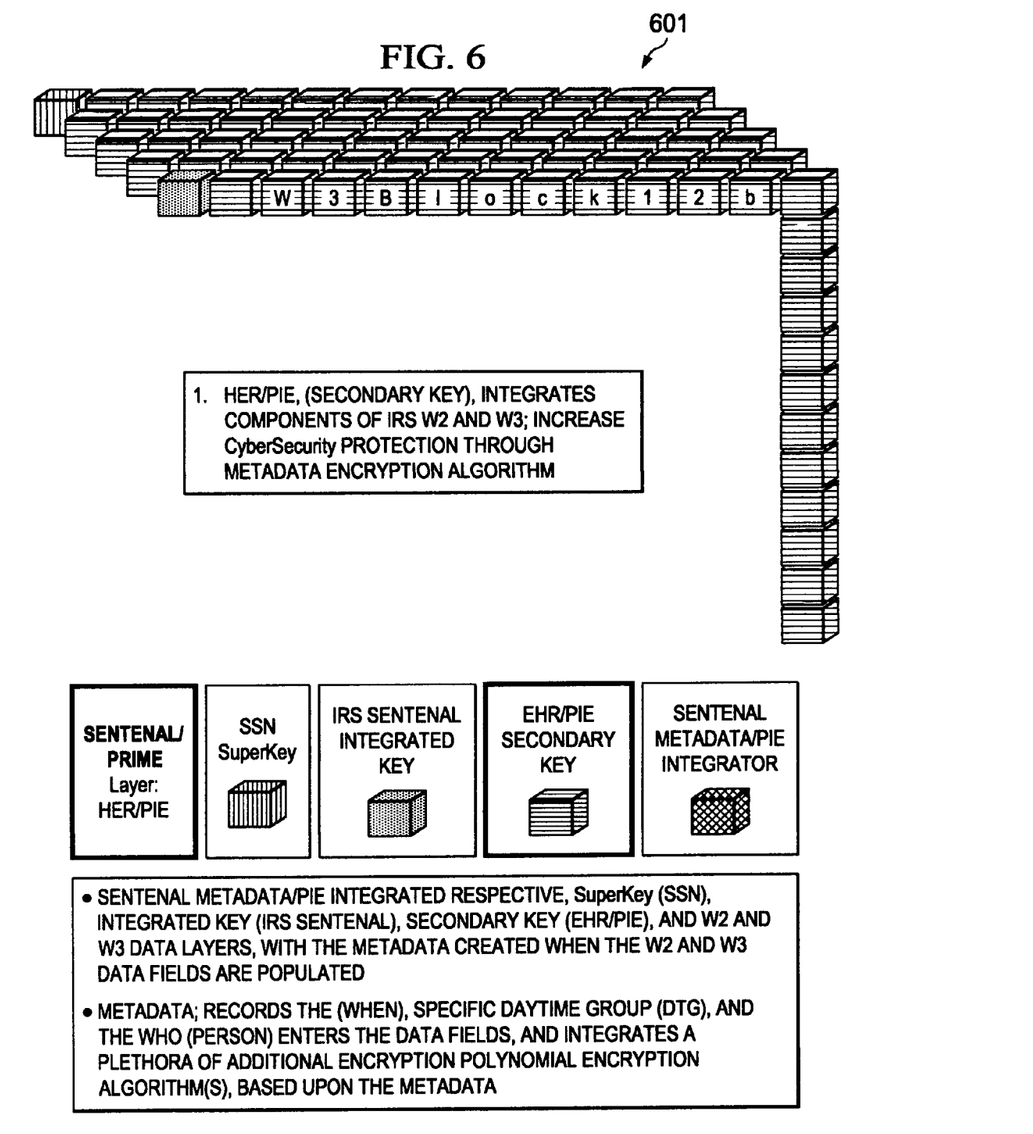
FIG. 6 illustrates the EHR/PIE Layer of the SENTENAL/PRIME Data Cube as embedded in the data encryption circuit of the invention.
Figure 7:
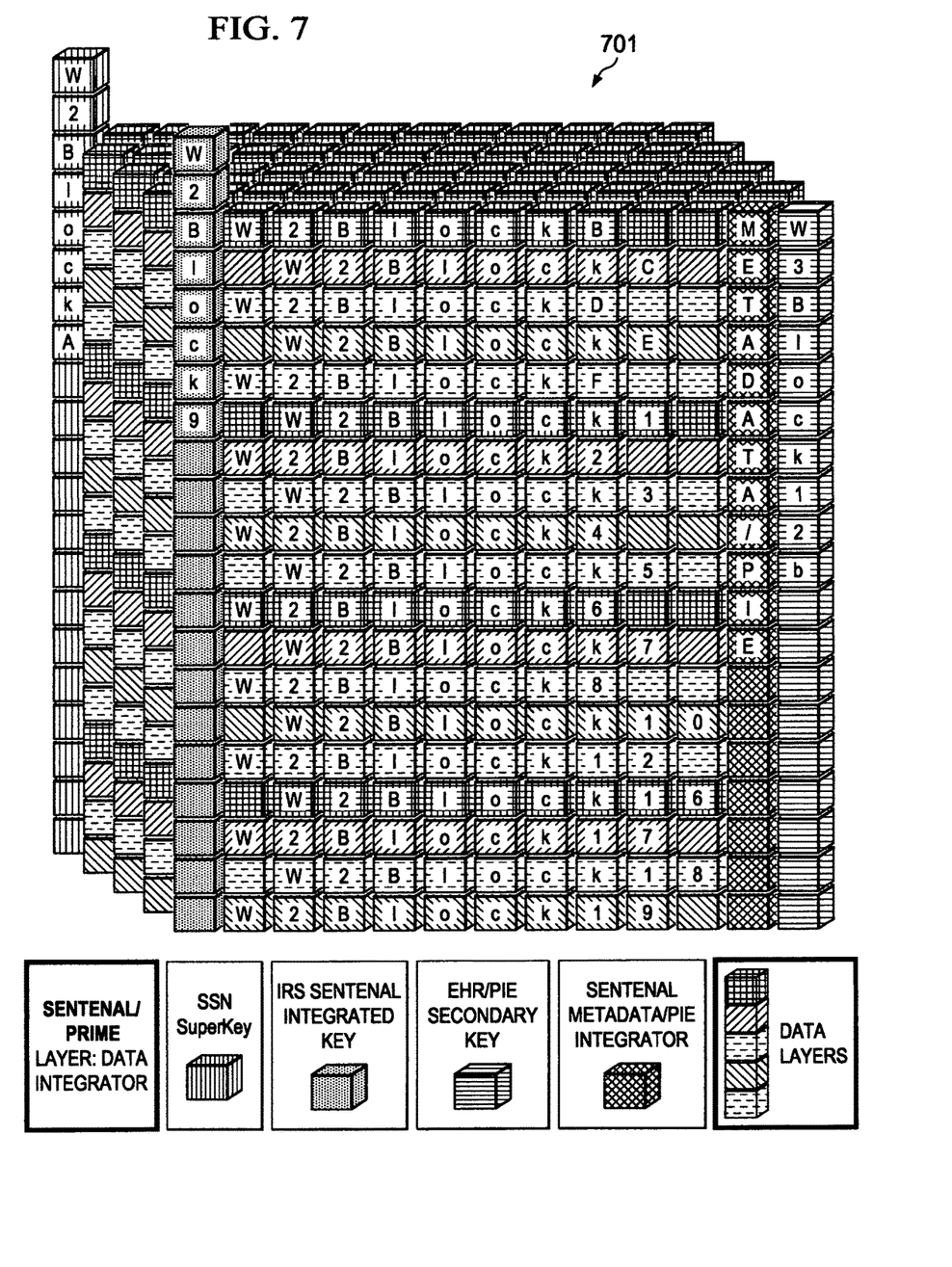
FIG. 7 illustrates the Data Layers of the SENTENAL/PRIME Data Cube as embedded in the data encryption circuit of the invention.
Figure 8:
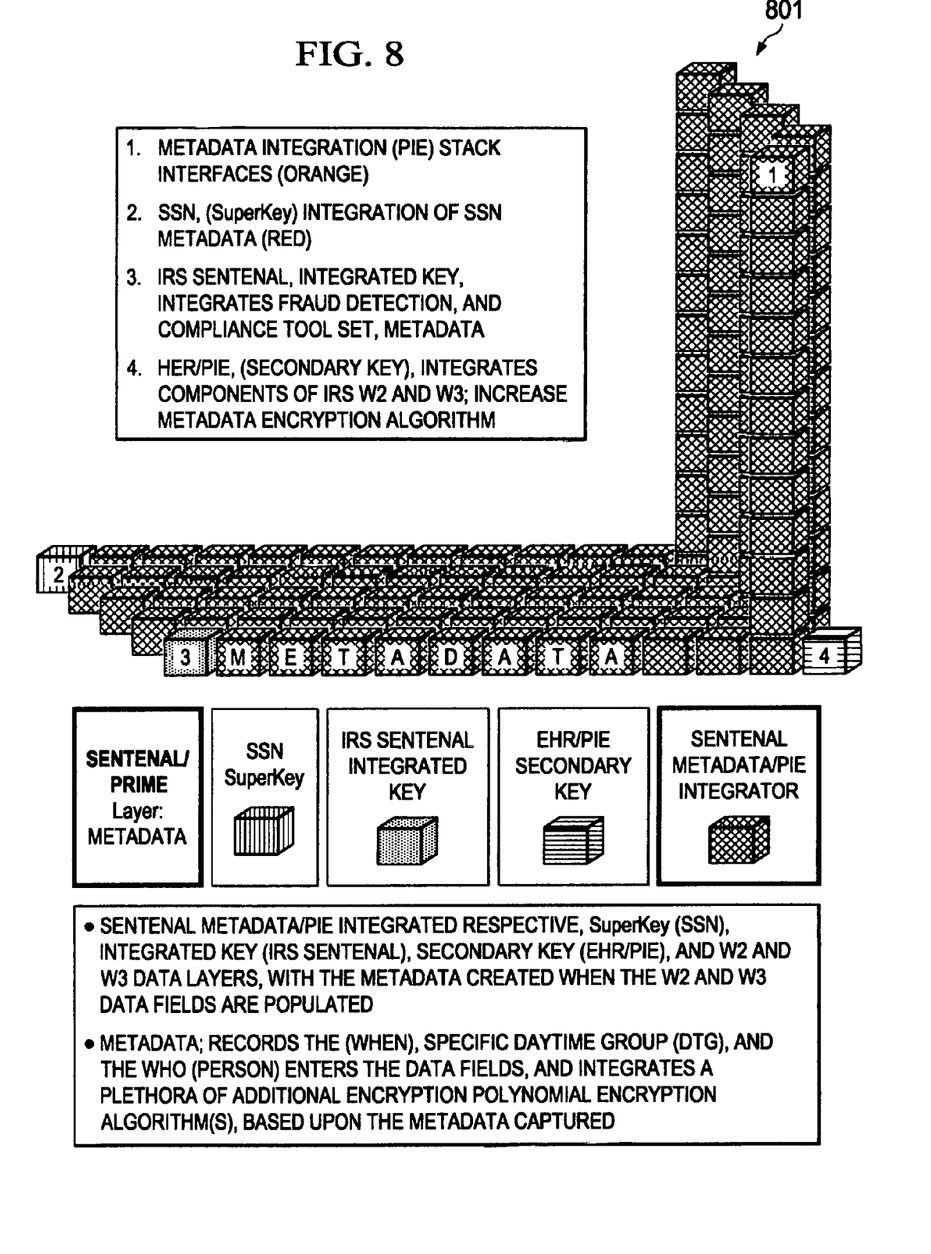
FIG. 8 illustrates the Metadata Layer of the SENTENAL/PRIME Data Cube as embedded in the data encryption circuit of the invention.

Reference is now made to the encryption circuit 1002 as seen in FIG. 10. Terms used below correlate to the terms used in the Figures. The SENTENAL/PRIME Data Cube 100, as seen in FIG. 1, is a multi-dimensional array data structure used in the data encryption circuit. Data entered therein is operated on using primary and secondary keys in a predefined sequence. The keys include a SUPERKEY 201, preferably comprising a tax payer Social Security Number (SSN) or Employer Identification Number (EIN), as seen in FIG. 2, an Integrated Key, referred to as an IRS SENTENAL Key 301, as seen in FIGS. 3 and 4, and a secondary key, referred to as the EHR/PIE Key 601, as seen in FIG. 6. The Integrator, referred to as the SENTENAL METADATA/PIE 801 as seen in FIG. 8 is further described herein. The above referenced Data 701, as seen in FIG. 7, is layered within the SENTENAL/PRIME Data Cube 100. The exemplary encoding of FIG. 4 was generated using representative Boolean logic gates as seen in FIG. 5 and is provided for illustration only. The inputs to generate the IRS SENTENAL Key 301 can be pseudo-randomly generated. As further described herein, a computer-implemented function, referred to as a SENTENAL Random Operational Cypher Key (ROCK), can define which Boolean logical gates as seen in FIG. 5, will correlate to alphanumeric character identified within the IRS SENTENAL Key 301 The encryption circuit 1002 synthesizes the encryption process for the streams introduced into to the SENTENAL/PRIME Data Cube 300. FIGS. 2, 3, 6, 7 and 8 comprise subsets of the larger SENTENAL PRIME Data Cube 100.

Figure 12:
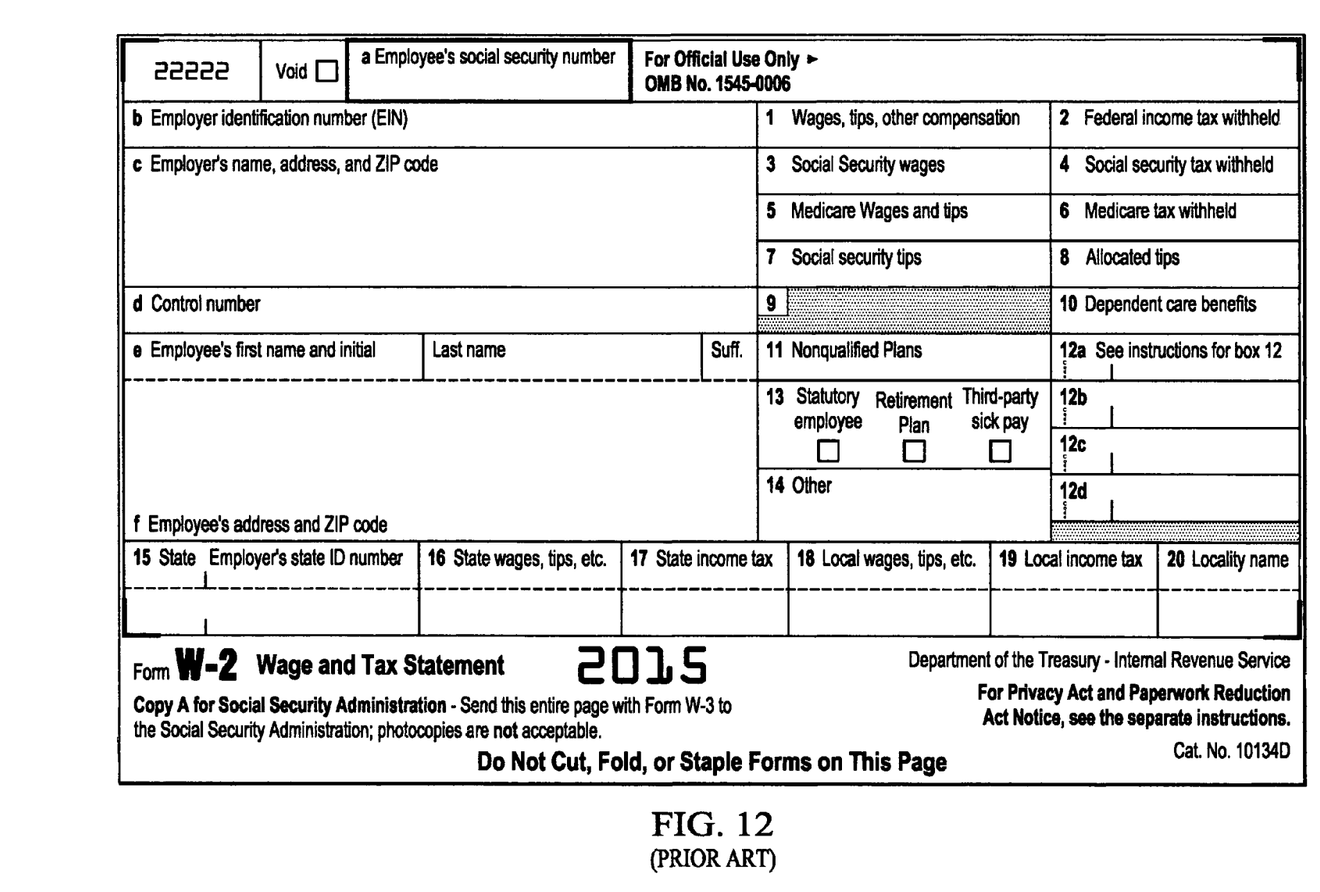
FIG. 12 illustrates IRS Form W2 onto which an alphanumeric character and/or encoded symbol representing the authentication code can be applied.
Figure 13:
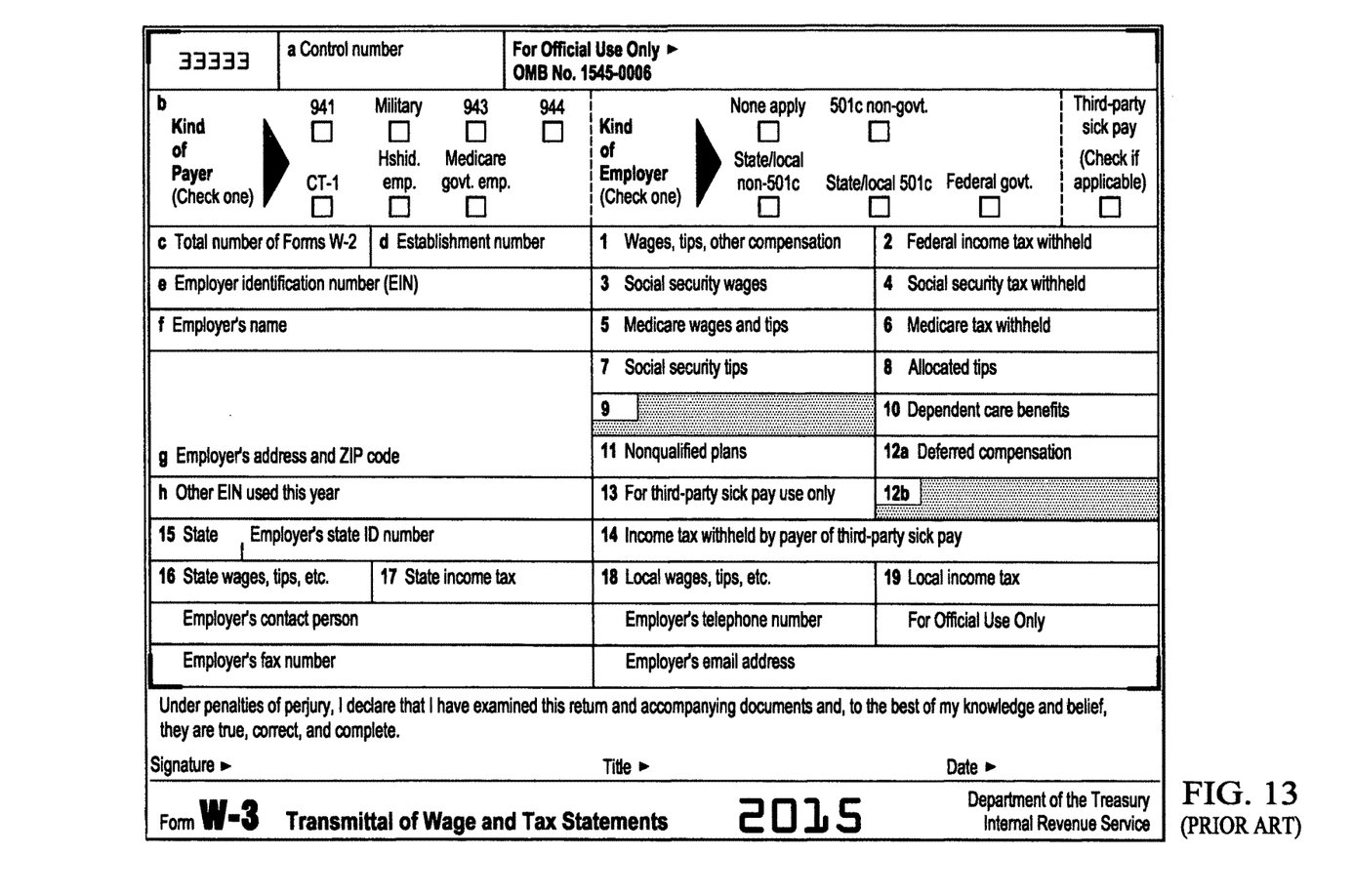
FIG. 13 illustrates IRS Form W3 onto which an alphanumeric character and/or encoded symbol representing the authentication code can be applied.
Figure 14:
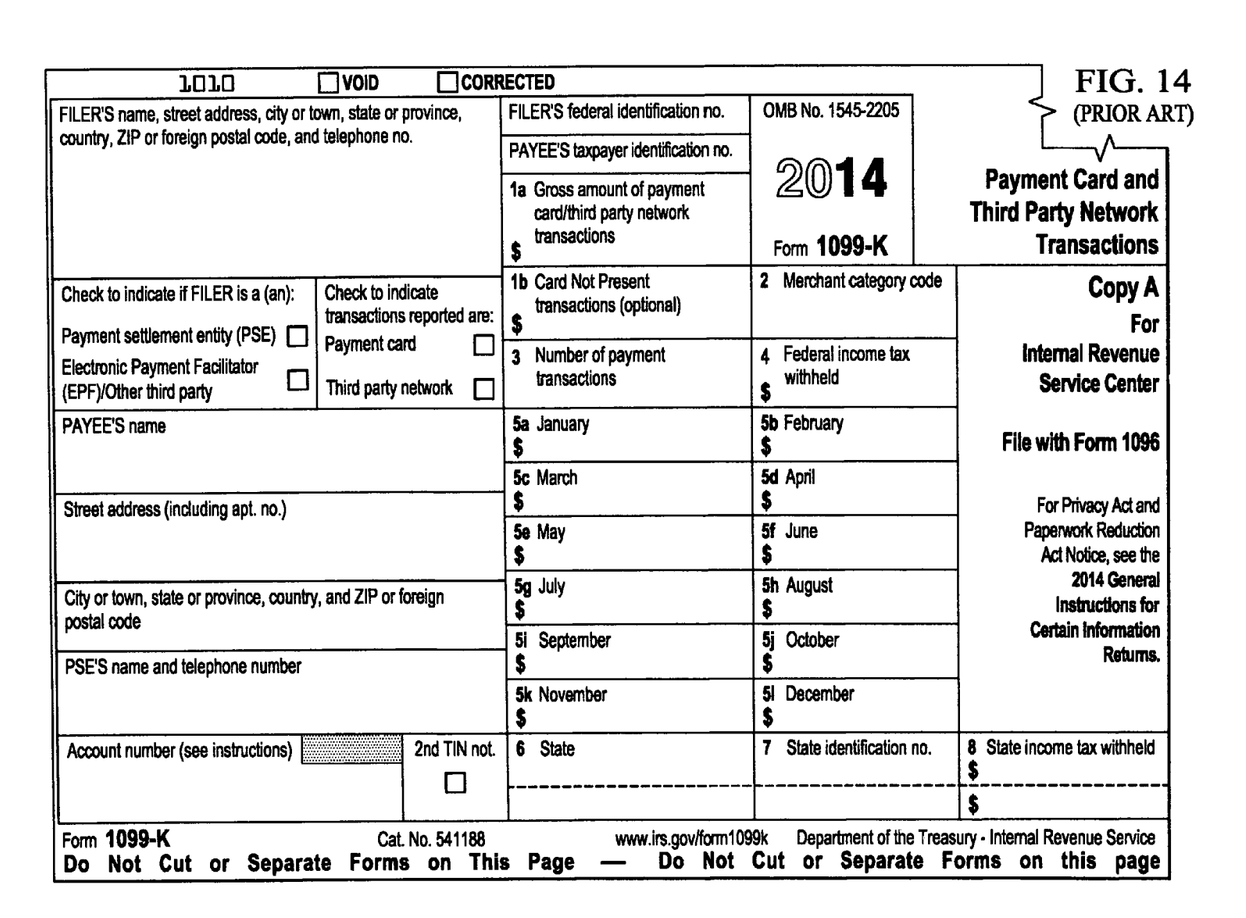
FIG. 14 illustrates IRS Form 1099-K onto which an alphanumeric character and/or encoded symbol representing the authentication code can be applied.

The data ingress circuit receives data from tax authority forms, such as those seen in FIGS. 12, 13 and 14. Applied to such data in the data encryption circuit are series of primary and secondary keys. In an exemplary embodiment, these keys are changed periodically so as to ensure a more secure encryption sequence.

An encryption stream is created by the complex integration of Boolean algebraic gates as a computational program and pathway sequences created from the primary and secondary encryptions keys, in the SENTENAL/PRIME Data Cube 100 along with the Variable Encryption Program (VEP), each unique sequence event where the SENTENAL/PRIME Data Cube 100, processes data will create a unique sequence of within the SENTENAL/PRIME Data Cube, as a starting point, and how the respective data elements are process through the Boolean algebraic gates as determine the PRIME starting location variable within the SENTENAL/PRIME Data Cube 100. The PRIME location is denoted as a Horizontal (H1, HN), and Vertical (V1, VN) location within the SENTENAL/PRIME Data Cube 100 virtual space.

More specifically, the subset of the IRS SENTENAL Key 301, integrated with the EHR/PIE Key 601, in a mathematical random program process that provides a defined location within the SENTENAL/PRIME Data Cube 100, as the PRIME location. The PRIME location (equivalent to an Alpha Card location which defines the upper boundary for a Data Cube), is the starting point for each functional encryption sequence. Each tax authority and/or tax reporting entity is assigned a unique PRIME location which establishes a unique starting (alpha) for the encryption stream. The PRIME is changeable every year. The employment of annual changing unique PRIME location provides the encryption algorithm with an increased complexity.

Additionally, the IRS SENTENAL Key 301, and EHR/PIE Key 601 define selected data locations along a horizontal (H) and Vertical (V) axis within the SENTENAL/PRIME Data Cube 100, where the combination of the creation of H+V within the data plane, and within the SENTENAL/PRIME Data Cube 100, creates the required integers (d, e) for the Boolean Encryption Sequence. When H+V is greater than or equal to n, that is, H+V>N, a minimum of 32 bits or larger is required for the encryption stream generated by the SENTENAL/PRIME Data Cube 100. The use of a serialized variable location based upon the respective IRS SENTENAL Key 301, and EHR/PIE Key 601, provides additional encryption complexity and reduces systemic algebraic vulnerability.

Once the PRIME location is determined within the SENTENAL/PRIME Data Cube 100, the next sequence will perform a variable probability shuffle function, where all data layers within the SENTENAL/PRIME Data Cube 100 will act similar to a "data card", being defined by the data drawn from the selected block from a taxpayer provided tax form. The respective "data cards" will be randomly probability shuffled, after the first (Alpha) card is determined by the IRS SENTENAL Key 301, and EHR/PIE Key 601. The last (Omega) "data card" in the shuttle defines the lower boundary of the SENTENAL/PRIME Data Cube 100. The Alpha and Omega Card, will define a specific SENTENAL/PRIME Data Cube 100, and is unlikely to ever repeat the same specific SENTENAL/PRIME Data Cube 100, assuming a technical operation using the same function, data sets, or variables. Once the "data card" shuffle has been performed, the METADATA layer 801, is inserted into the SENTENAL/PRIME Data Cube 100, between the Alpha Layer, and the Omega Layer. This insertion function will combine data sets from respective SENTENAL PRIME Keys 301, and perform a probability analysis, and insert each data layer 701 in a different location every time, until the function is completed.

The invention integrates the metadata from the SENTENAL PRIME Keys when the respective data is entered into the SENTENAL/PRIME respective locations, whereupon the respective metadata will be written to memory. The metadata will include the Julian Date and Time, such as based on a 24 hour clock, in milliseconds, the identification, by name or identification number, of who entered the data, the foregoing be compiled into a unique numerical sequence. This metadata will be mapped to the horizontal and vertical axis of the Metadata layer within the SENTENAL/PRIME Data Cube 100. The horizontal and vertical layer of the SENTENAL/PRIME Data Cube 100 will act as an identical data mirror, within the respective data location(s). In a further aspect of the invention, Global Positioning Satellite (GPS) locational data can be incorporated into the function.

In a further aspect of the invention, data from tax authority databases can be integrated into the function. In a further aspect of the invention, a tax authority can create separate and autonomous functional and logical databases for respective authorities and tax reporting and paying entities each having a unique identifier, but identical functionality. This will create a functional and logical separation of data to be entered into the SENTENAL/PRIME Data Cube 100, providing resilience, isolation and robustness.

At the data ingress circuit 1001, suitable machine-to-machine and user interfaces can be provided to facilitate batch file access to selected taxing authorities, such as the Social Security Administration. Such interfaces into the invention are coupled to the data encryption circuit using secure protocol pathways so as to establish hard-encrypted pathways between the participants and users.

In a further aspect of the invention, a function referred to a SENTENAL/RANDOM OPERATIONAL CYPHER KEY (ROCK) is operable to create the Boolean logic pathway sequences. Using ROCK, a tax authority —is then able to define the Boolean logical gates 500 as seen in FIG. 5, that will correlate to alphanumeric character identified within the IRS SENTENAL Key 301 that will create the logic stream for the SENTENAL PRIME METADATA/PIE computational integrator as established by the coded sequences selected by the IRS SENTENAL Key 301 and HER/PIE 601 Key to select the Boolean logic gates 501 from the respective table with the SENTENAL/PRIME program and data and seen in FIG. 4, from the SENTENAL PRIME Data Cube 100. The IRS SENTENAL Key 301 establishes the unknown BOOLEAN Encryption Chain (BEC) that is applied to the SENTENAL/PRIME Data Cube 100 for a respective period, such as a Tax Year. For example, every tax year, a different ROCK, will be created, along with a new BOOLEAN Encryption Chain for each tax authority Region, based upon the IRS SENTENAL Key 301.

The ROCK is integrated with the IRS SENTENAL Key 301, where the Boolean logic gates 501 will direct data flow as defined by a tax authority. This encrypted methodology correlates the characters from the IRS SENTENAL Key 301 and will provide an unknown variable to each tax authority region. To create the SENTENAL PRIME METADATA/PIE computational integrator, data flows through the Boolean logic gates 501 to create a Key data stream for integration of the selected data element from the SENTENAL/PRIME Data Cube 100. The Boolean logic gates 501 create the variable equivalence of integrating components of historical encryption elements, which otherwise could only be done with advanced computer-implemented methods using complex, advanced algorithms. This illustrated in FIG. 4 wherein a notional example of an IRS SENTENAL Key 301, is integrated with a solution keycard so as to establish the key stream for the SENTENAL/PRIME Data Cube 100 in a certain period, such as a tax year.

By using the authentication code 901, the invention is operable to create a more efficient means for processing tax returns, through the integrated barcoding of the authentication code 901. Barcoding can accelerate the processing of simple taxpayer returns. The invention's effective use of a Superkey, integrated keys, secondary keys, and metadata with a polynomial encryption encoding function provides protection to the tax authority and taxpayer. Coupled with secure transfer protocols, and two-person integrity, the invention is operable to reduce insider threats. Effective policies and procedures along with effective internal controls are essential to ensuring the protection of the integrity and effectiveness of the authentication system and codes.

The invention can be embodied in a computer program that integrates an encryption function using a multi-dimensional array data structure, and entering therein layers of data sets representing PII from existing tax forms. As the data sets are entered, an encryption algorithm is performed against the data sets using, while integrating metadata, and further applying vertical and horizontal integration of primary and secondary keys such as a Superkey (SSN) 201, Integration Key (IRS SENTENAL), and Secondary Key (EHR/PIE). The mathematical complexity of the process results in an extraordinarily high degree of uniqueness for each authentication code 901.

The invention can be effectively employed with more advanced cyber security tools for the detection of fraud and criminal activity. Additionally, it will be understood that certain embodiments may be utilized independently of, or in conjunction with, each other. For example, embodiments related to the generation of the authentication code 901 may also be used in conjunction with other financial systems in the processing of tax documents or tax returns. To increase the security of the invention and the data and keys used therewith, the invention can be isolated from any other publicly coupled or connected networks or systems. Further, each authentication code 901 should be limited to a one-time use.

While this embodiment has been described in relation to a generation of an authentication code 901 using a set of keys applied to data using a predefined sequence, alternative embodiments could have any number of keys or predefined sequences.

While the flow diagrams in the figures show a particular order of operations performed by certain embodiments of the invention, it should be understood that such order is exemplary. Alternative embodiments may perform the operations in a different order, combine certain operations and/or overlap certain operations.

While the invention has been described in terms of several embodiments, those skilled in the art will recognize that the invention is not limited to the embodiments described, can be practiced with modification and alteration within the spirit and scope of the claims. The description is thus to be regarded as illustrative instead of limiting. Moreover, while certain embodiments have been described with reference to method steps performed in an exemplary order, it will be understood that various steps may be performed in a different order or sequence. Figures or diagrams provided are non-limiting examples of how embodiments may be implemented.

What is claimed is:

1. An apparatus for generating an authentication code for validating transactional data, comprising:
   a data ingress having a data ingress input sub-circuit and data ingress output sub-circuit; and
   a data encryption circuit having a data encryption input sub-circuit and data encryption output sub-circuit, the data encryption output sub-circuit, the data ingress output sub-circuit, the data encryption output being coupled to the data egress input sub-circuit; and
   a data egress circuit having a data egress input sub-circuit and data egress output sub-circuit, the data encryption output sub-circuit being coupled to the data egress input sub-circuit;
   the data encryption circuit further comprising a multi-dimension array data structure, the data encryption circuit operable to receive from the data ingress circuit in a predefined sequence, layers of data sets encoded in binary form representing personally identifiable information (PII) and primary keys and secondary keys;
   the data encryption circuit operable to apply selected primary keys and secondary keys against the layers of data sets in a predefined sequence, during such sequence, so as to encrypt such data and generate an authenticate code;
   a SENTENAL Metadata, layered within the multi-dimensional data structure, captures a day-time-group (DTG), and technical Metadata, that integrates an additional encryption algorithm, by combining the data elements with Metadata that is not reused in the application as part of a One-Time-Pad (OTP); and
   the data encryption circuit operable to output the authentication code to the data egress circuit; and
   the data egress circuit operable to format the authentication code as a series of alphanumeric characters and/or at least one symbol.

2. The apparatus of claim 1, wherein the outputted at least one symbol is one selected from the group of barcode and QR code.

3. The apparatus of claim 2, wherein a series of alphanumeric characters and/or at least one symbol is printed on a taxpayer form or embedded in taxpayer electronic document.

4. The apparatus of claim 1, wherein the data encryption circuit is operable to use the primary and secondary keys in a polynomial integer encryption (PIE) sequence on the originally unencrypted data;
   a unique Metadata numerical sequence, mapped from the horizontal and vertical axis within SENTENAL/ PRIME Data Cube, will be integrated with respective Global Positioning Satellite (GPS), locational data to increase the complexity and singularity of the encryption algorithm;
   the data encryption circuit operable to output the authentication code to the data egress circuit; and
   the inclusion of Metadata in the data egress circuit operable to format the authentication code as a series of alphanumeric characters and/or at least one symbol.

5. The apparatus of claim 4, wherein the primary keys comprise at least a Superkey and IRS SENTENAL Key and the secondary key comprises at least an HER/PIE Secondary Key.

6. The apparatus of claim 5, wherein the Superkey comprises a Social Security Number (SSN).

7. The apparatus of claim 5, wherein the IRS SENTENAL Key comprises a series of alphanumeric characters generated by a tax authority securely transmitted by the tax authority to the tax reporting or tax paying entity for inclusion on a specific tax form.

8. The apparatus of claim 7, further comprising:
   generating the HER/PIE Secondary Key from metadata stored in a database, the metadata related to the input of the layers of data sets into the data ingress circuit, such EHR/PIE Secondary Key being included in the polynomial integer encryption (PIE) equation during the encryption and authentication code generation process.

9. The apparatus of claim 7, wherein the metadata include data identifying the individual inputting data sets into the data ingress circuit and the data and time of such input actions.

10. The apparatus of claim 1, wherein the authentication code in the form of alphanumeric characters and/or at least one symbol is applied to a paper copy of a tax form or embedded in an electronic document to be distributed by a tax authority to a tax reporting or tax paying entity.

* * * * *